United States Patent Office 2,846,146
Patented Aug. 5, 1958

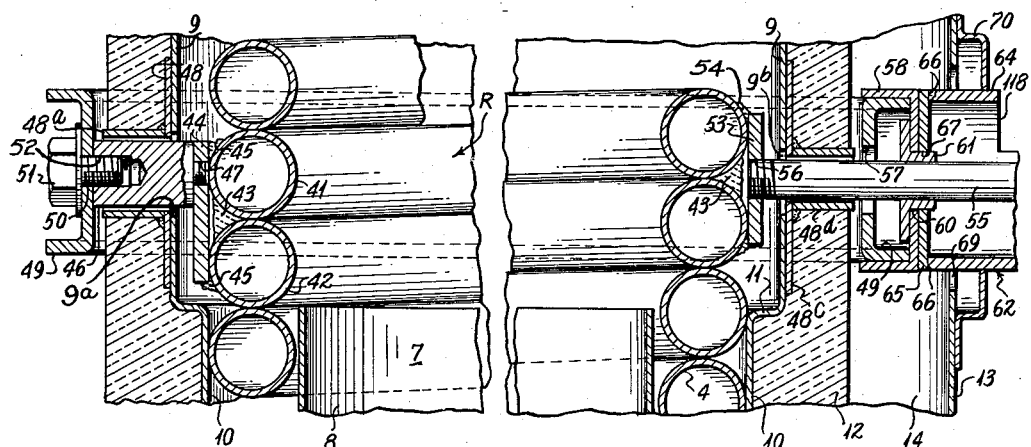
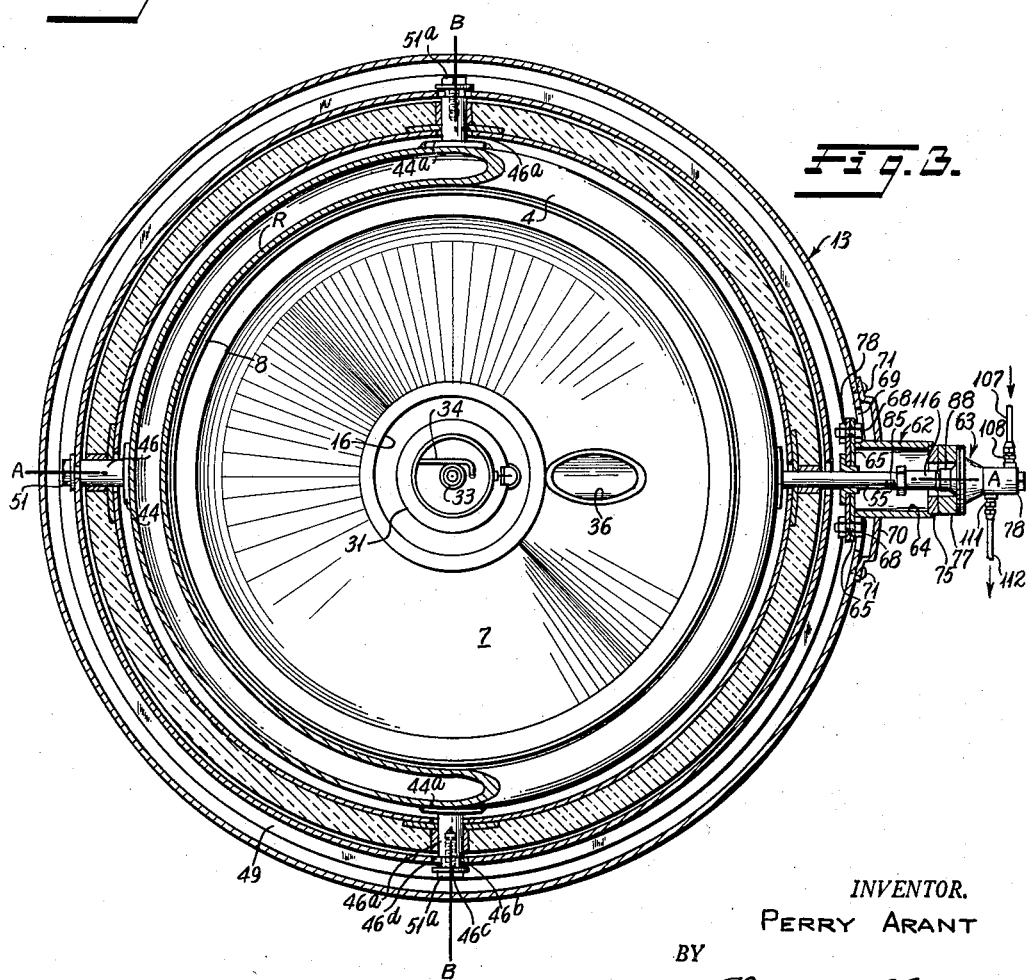

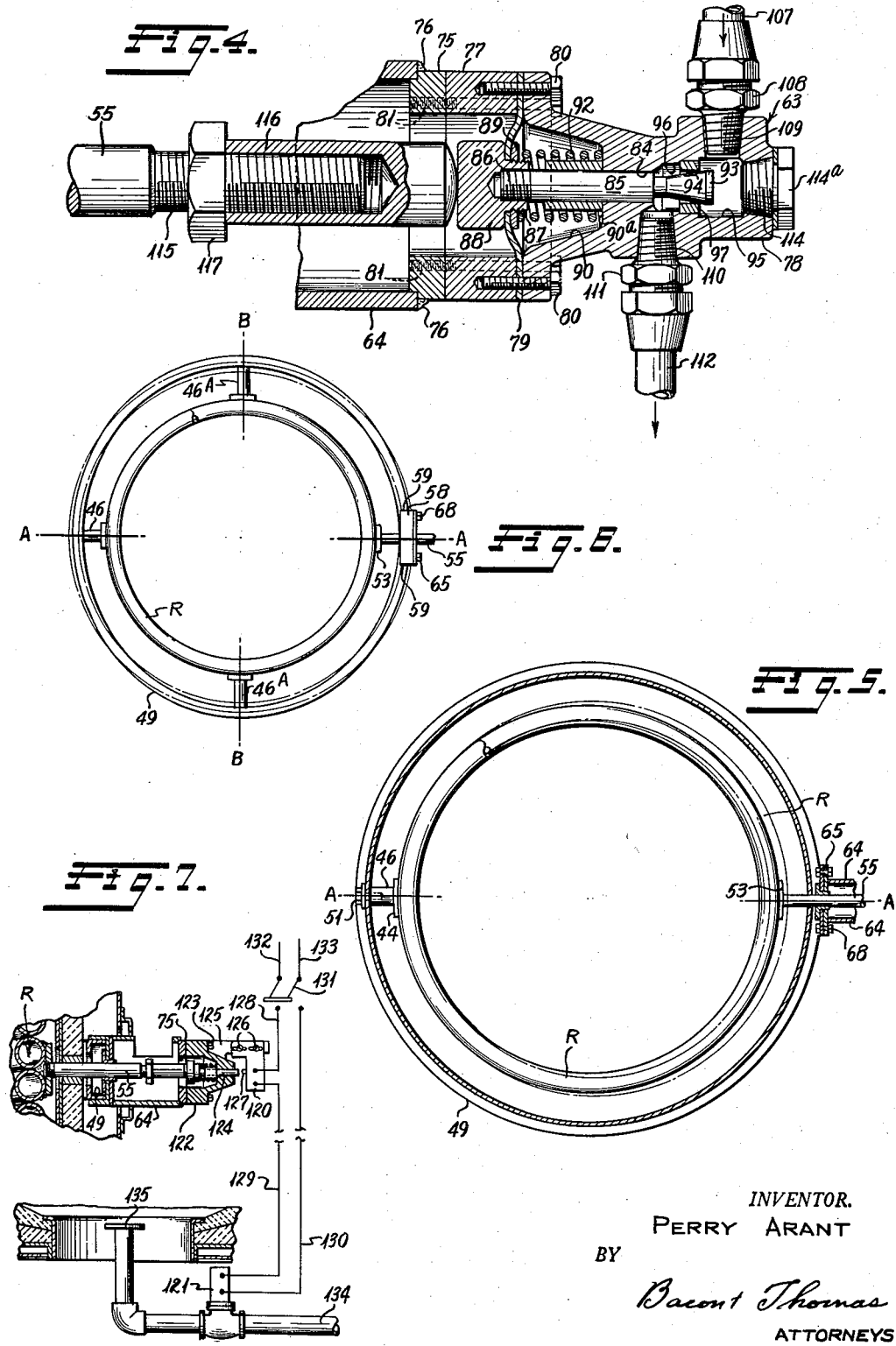

2,846,146

AUTOMATIC FUEL VALVE CONTROL MEANS

Perry Arant, San Gabriel, Calif., assignor to Clayton Manufacturing Company, El Monte, Calif., a corporation of California Application June 23, 1955, Serial No. 517,438

20 Claims. (Cl. 236—20)

The present invention relates to automatic means for controlling the supply of fuel to fluid heating apparatus and, more particularly, to automatic means for controlling a fuel by-pass valve, or a switch controlling a fuel shut-off valve, for controlling the fuel supply to water heaters, steam generators, steam heaters, etc.

More specifically, the invention relates to automatic fuel valve control means that is responsive to the temperature differential between the heating coil temperature and the temperature of a member exposed to ambient air, rather than to materials having differing coefficients of expansion. However, it is to be understood that materials having different coefficients of expansion can be used in practicing the principles of the present invention, although a unique feature of these principles is that they make it possible to use materials having the same coefficient of expansion and still obtain the desired results.

One of the unusual features of the present invention is that it utilizes a portion of the heating coil of the apparatus as one element of the thermally responsive fuel valve control means. In this connection, two adjacent convolutions of a water wall portion of the heating coil are welded together to form a continuous tube ring, which is preferably located in the hottest part of the combustion chamber, and, therefore, is subjected to the highest temperatures available. The other thermally responsive element consists of an outer or second continuous member, which is arranged concentric with the tube ring and may be generally channel shaped in cross section rather than tubular. The outer ring is located exteriorly of the combustion chamber, but within a jacket enclosing the apparatus, and which ring serves as a support for a fuel by-pass valve. The construction of the apparatus is such that the outer ring is maintained relatively cool by virtue of the fact that the combustion chamber is insulated therefrom, so that the temperature of the second ring will vary substantially with ambient temperatures. The tube ring may be subjected to combustion temperatures ranging from about 1200° F. to 3000° F., whereas, the valve supporting ring may be exposed to temperature varying anywhere from normal room temperature of about 70° F. up to about 200° F., depending upon the amount of heat that passes through the insulation surrounding the combustion chamber. In view of the foregoing temperature differential between the tube ring and the valve supporting ring, both rings may be made of the same material, for example, low carbon steel, and need not be made of materials having different coefficients of expansion as is commonly done in conventional thermostat control devices. It will be understood that by utilizing a portion of the heating coil itself as the principal actuating element of the thermostat control, very sensitive and positive fuel regulation can be obtained, since the heating coil contains the liquid and/or fluid being heated, which has a direct effect upon the ultimate expansion of the tube ring, regardless of variations in the combustion chamber temperature.

The differential expansion of the tube ring and the outer ring is utilized in one form of the invention to directly actuate the fuel valve. In this connection, the fuel valve is fixedly supported on the outer ring, and the tube ring and outer ring are interconnected in such manner that the differential expansion of the two rings causes relative movement between the rings in the region of the fuel valve, this movement being utilized to actuate the stem of the fuel valve to by-pass fuel around the burner and thereby reduce the amount of fuel delivered to the burner when the temperature conditions of the tube ring are such as to require a reduced amount of heat.

In another form of the invention, a normally closed switch is mounted on the outer ring and connected in circuit with a solenoid-operated fuel supply valve so that the valve is deenergized to close and shut off the supply of fuel (either liquid or gas) to the burner when the condition of the fluid in the heating coil so requires.

The principal object of the invention is to provide an automatic control device for a fuel valve that is responsive to temperature conditions of the heating coil itself, as well as to that of an element which is not directly subject to the heat of the combustion chamber.

Another object is to provide a thermostat control device for a fuel valve which is responsive to a differential in temperature, rather than to the rates of expansion of two different metals.

A further object is to provide control means for a fuel valve that is positive in its action, and which is not subject to the disadvantages of prior thermostat control devices, for example, immersion type thermostats, which are subject to change in their actuating characteristics, due to internal scale formations, or to exposed bimetallic members which are subject to external carbon deposits.

A still further object is to provide a thermally responsive fuel valve control means that is extremely simple to manufacture and assemble and which is readily adapted to have its characteristics modified by pre-stressing one of the elements to alter the ultimate combined action of the elements on the action of the fuel control valve.

Another important object of the invention is to provide thermally responsive means for controlling a fuel valve which is constructed so that it is influenced in its action by the temperature of the fluid being heated and which directly actuates the fuel valve.

Other features and objects of the invention will be apparent from the following description taken in conjunction with the accompanying drawings, in which:

Fig. 2 is an enlarged fragmentary sectional view particularly illustrating the two adjacent convolutions of the heating coil that are welded together to form a tube ring and which carries the valve actuating element of the present control device;

Fig. 3 is a horizontal sectional view taken on the line 3—3 of Fig. 1;

Fig. 4 is a fragmentary horizontal sectional view through the fuel control valve;

Fig. 5 is a horizontal sectional view illustrating a modified arrangement of the thermostat tube ring and fuel valve supporting ring;

Fig. 6 is a diagrammatic view illustrating the action of another modified arrangement of the tube ring and its associated fuel valve supporting ring; and Fig. 7 is a diagrammatic view of a modification in which a switch, instead of a valve, is directly actuated in accordance with the differential expansion of the two rings to control a solenoid-operated fuel valve.

Figure 1:
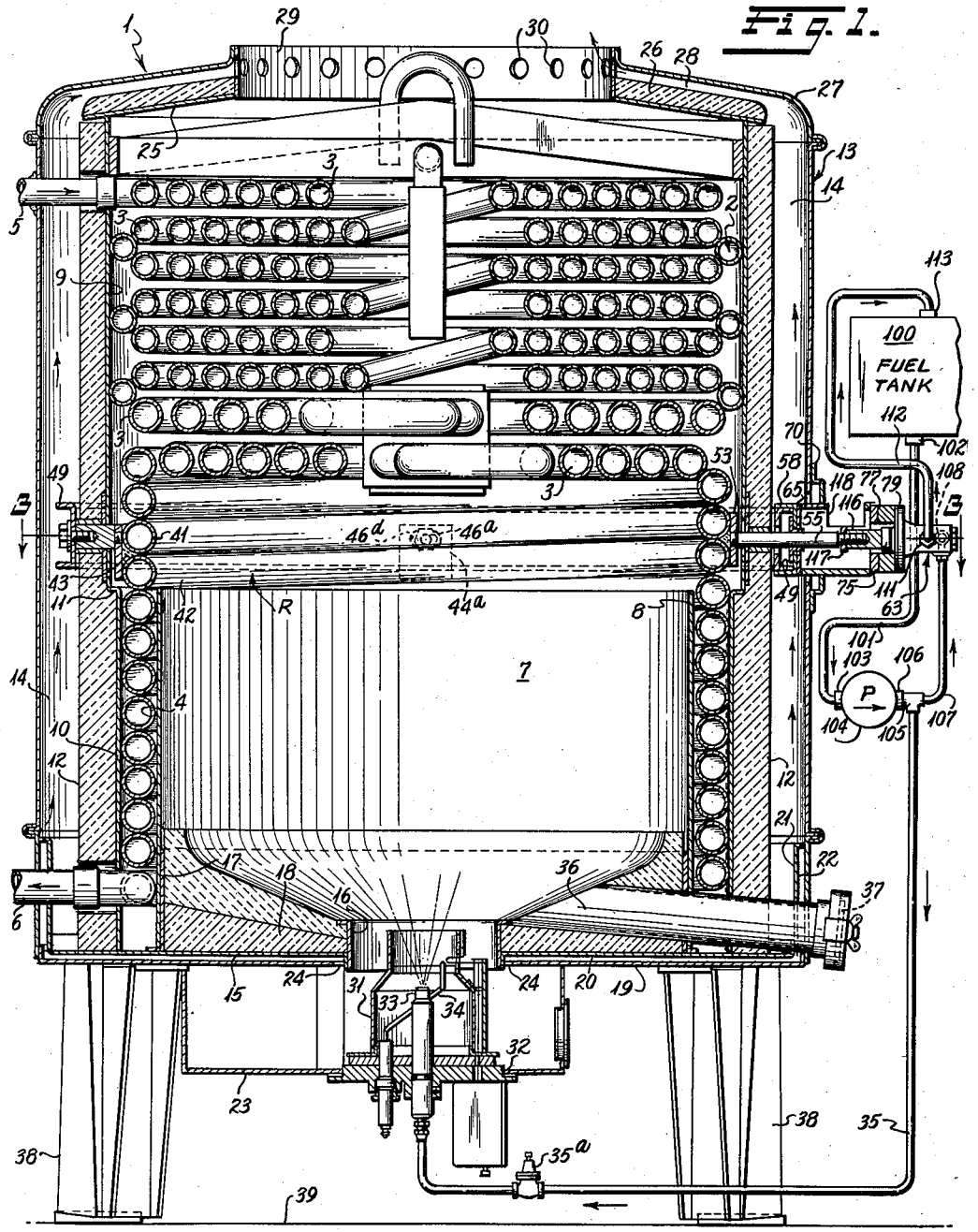
Fig. 1 is a vertical sectional view through a steam generator embodying a fuel valve which is directly controlled by the differential expansion of two concentric ring elements arranged in accordance with the principles of the present invention, certain elements comprising the apparatus being diagrammaticaly shown in the interest of completeness of disclosure.

Referring now to Fig. 1, the steam generating apparatus generally is identified by the numeral 1 and comprises a heating coil 2 including a number of conventional pancake sections 3 disposed above a series of vertically superposed convolutions forming a water wall section 4. The liquid to be heated is introduced into the coil 2 through an inlet 5 and discharges from the coil through an outlet 6. The water wall section 4 surrounds a combustion chamber 7 containing a liner 8 of high heat resistant material, such as stainless steel. The heating coil 2 is enclosed by a cyclindrical metallic shell comprising an upper section 9 and a lower and slightly smaller section 10 which are joined by an offset portion 11, in a zone immediately above the upper end of the liner 8. The shell portions 9 and 10 are surrounded by heat insulating material 12 enclosed by a metal jacket generally identified by the numeral 13, an air space 14 being provided between the insulating material 12 and the jacket 13.

The jacket 13 comprises a bottom wall 15 having a central opening in which a sleeve 16 is mounted, the sleeve 16 providing means through which air can be introduced into the combustion chamber 7. A ring 17 rests upon the bottom wall 15, within the liner 8, and refractory material 18 rests upon the bottom wall 15 between the sleeve 16 and ring 17, to protect said bottom wall from the heat of combustion. The jacket 13 includes a second bottom wall 19 disposed below the bottom wall 15 to provide an air space 20 therebetween. The bottom wall 15 has an upperwardly extending flange portion 21 spaced inwardly from the jacket 13 to provide an annular air space 22, which communicates with the air space 24. A casing 23 is disposed below the wall 19 and provides a chamber to which air is delivered by a blower (not shown) and causes it to travel in a volute path before discharging through the sleeve 16 into the combustion chamber 7. A portion of the air delivered to the casing 23 is diverted through openings 24 adjacent the inner edge of the wall 19 for flow through the air space 20, and thence through the annular air spaces 22 and 14 for effecting air cooling of the jacket 13.

A conical ring 25 is supported by the upper end of the shell 9 and is covered by a layer of insulating material 26. The jacket 13 includes a top portion 27 which overlies the insulating material 26 and is separated therefrom by an air space 28. A flue ring 29 is mounted in a central opening within the top portion 27 and extends downwardly to the conical ring 25 and is provided with a plurality of openings 30 that communicate with the air space 28. It will be understood that the products of combustion from the combustion chamber 7 are discharged through the ring 29, along with the cooling air that is diverted from the casing 23 to effect cooling of the jacket 13.

A burner manifold 31 is mounted in an opening 32 in the casing 23 and carries an oil burner nozzle 33 and conventional ignition electrodes 34. Fuel oil is delivered to the nozzle 33 through a conduit 35 connected with the lower end of the nozzle assembly. An automatic, spring-loaded shut-off valve 35a is connected in the conduit 35 near the nozzle 33. A tube 36 extends radially through the jacket 13, insulating materials 12 and 18 to a point adjacent the sleeve 16. The inner end of the tube 36 terminates flush with the insulating material 18 and the outer end of the tube 36 is closed by a conventional combustion observation window 37. The window 37 can be opened, when desired, to utilize the tube 36 as a manual burner ignition port, should occasion therefor arise. The complete jacket assembly is mounted upon a plurality of legs 38 to maintain the same in spaced relation to a floor 39.

It will be noted from Figs. 1 and 2 that the convolutions of the water wall section 4 are in contact. Two of these convolutions, identified by the numerals 41 and 42, are disposed immediately above the upper end of the liner 8 and below the pancake coils 3, and are thus exposed to the highest temperature in the combustion chamber 7. The convolutions 41 and 42 are welded together on the outer side thereof and preferably throughout a complete turn, rather than at a single or circumferentially spaced points, by welding material 43, so that the convolutions 41 and 42 constitute a single uninterrupted ring. Moreover, the convolutions 41 and 42 are thus effectively prevented from moving relative to each other and therefor expand and contract as a unit upon heating and cooling. The ring formed by the convolutions 41 and 42 constitutes one element of the thermostat control and will be hereinafter referred to for convenience as the tube ring R.

A plate 44, Fig. 2, is welded to the tube ring R, as indicated at 45. A spacer 46 has a threaded extension 47 mounted in a threaded hole in the plate 44 and extends through an opening 9a in the shell portion 9. A disc 48 is welded to the shell 9 and carries a sleeve 48a axially aligned with the opening 9a. The spacer 46 extends through the sleeve 48a and is of a length sufficient to project into the air space 14. The outer end of the spacer 46 engages the inner surface of an outer concentric ring 49, which is generally channel-shaped in cross section. The ring 49 constitutes the second element of the thermostat control and will be referred to as a supporting ring, since it does support a fuel control valve, as will presently appear. The supporting ring 49 is provided with an opening 50 through which a cap screw 51 extends and is received in a threaded opening 52 in the spacer 46. The cap screw 51 is drawn up tightly so that the supporting ring 49 is rigidly fixed to the tube ring R at one point.

A second plate 53 is welded to the tube ring R as indicated at 54, Fig. 2, and is disposed on a common diametrical line A—A with the plate 44. A valve actuating rod 55 is mounted in a threaded opening 56 in the plate 53 and is thus rigidly connected to the tube ring R. The rod 55 extends through an opening 9b in the shell portion 9 and through a plate 48c and sleeve 48d, similar to the plate 48 and sleeve 48a, previously described. The rod 55 also extends through an opening 57 in the supporting ring 49.

A short channel member 58 is disposed in overlapping relation with the supporting ring 49 and is preferably welded thereto at its ends as indicated at 59, Fig. 6. The member 58 has an opening 60, Figs. 2 and 3, in which a flanged bushing 61 is mounted and serves as a guide for the rod 55. The rod 55 extends slidably through and beyond the bushing 61 into a housing 62, which serves as a mounting means for a fuel control valve generally identified by the numeral 63. The housing 62 includes a cylindrical portion 64 having a flat plate 65 welded to one end thereof as indicated at 66. The plate 65 has an opening 67 into which the bushing 61 projects for aligning the housing 62 with the supporting ring 49. The plate 65 is secured to the channel portion 58 by a pair of bolts 68, best shown in Fig. 3. It will be noted that the cylindrical housing portion 64 extends through an opening 69 in the jacket 13, and through which opening access may be had to the bolts 68. The opening 69, in turn, is concealed by a closure plate 70 secured to the jacket 13 by screws 71.

An annulus 75, Fig. 4, has one edge thereof rabbeted to permit the same to partially extend into the outer end of the cylindrical housing portion 64, and is welded thereto as indicated at 76. The fuel control valve 63 includes a base portion 77 and a body portion 78, having a flexible diaphragm 79 interposed therebetween, and maintained in assembled relation therewith by a plurality of cap screws 80. The valve base 77 is disposed in confronting relation to the annulus 75 and the entire valve assembly is mounted on said annulus by a plurality of relatively long cap screws 81. Thus, the fuel valve 63 is mounted in fixed relation to the supporting ring 49 at a point diametrically opposite the spacer 46.

The valve body 78, Fig. 4, has a bore 84 in which a stem 85 is slidably mounted. The outer end of the stem 85 has threads 86, which extend into a threaded extension 87 of a diaphragm-clamping member 88. The extension 87 is also externally threaded and a clamping washer 89 is mounted thereon for tightly clamping the diaphragm 79 against the member 88. The body 78 also has a chamber 90 adjacent the diaphragm 79 and a cylindrical sleeve 91 is disposed therein in surrounding relation to the stem 85. A compression spring 92 surrounds the sleeve 91 and has one end thereof in engagement with the end wall 90a of the chamber 90 and the opposite end in engagement with the washer 89. The sleeve 91 is adapted to be engaged by the end of the extension 87 to limit movement of the stem 85 toward the right, i. e., in a direction to open the valve 63.

The stem 85 has an extension including a cylindrical portion 93 at its inner end, and which extension is tapered for a portion of its length as indicated at 94. The valve body 78 also has an inlet chamber 95 and an outlet chamber 96 with an annular seat 97 mounted therebetween. The tapered portion 94 of the stem 85 cooperates with the seat 97 to control the flow of fuel from the inlet chamber 95 to the outlet chamber 96. It will be understood that the opening in the seat 97 is such as to slidably receive the cylindrical portion 93 of the stem 85 with slight clearance, so that the tapered portion 94 cooperates with the seat 97 to gradually restrict or gradually increase the rate of flow of fuel through said seat, depending upon the movement of the stem 85.

Fig. 1 diagrammatically illustrates a fuel tank 100 for a liquid fuel, such as oil. One end of a conduit 101 is connected to the bottom of the tank 100 at 102 and the opposite end of said conduit is connected to the inlet side 103 of a conventional fuel pump 104. A conventional T-fitting 105 has one end thereof connected with the outlet 106 of the pump. The stem of the pipe-T 105 is connected to the conduit 35, previously referred to, leading to the burner nozzle 33. The other side of the pipe-T 105 is connected by a conduit 107 to a conventional fitting 108, Fig. 4 mounted in a threaded opening 109 communicating with the inlet chamber 95 of the valve 63. The valve body 78 has a threaded opening 110 communicating with the outlet chamber 96 and a conventional fitting 111 is mounted in said opening. One end of a conduit 112 is connected with the fitting 111 and its opposite end is connected at 113 to the upper end of the fuel tank 100, Fig. 1. The valve body 78 is further provided with a threaded opening 114, Fig. 4, which is closed by a conventional plug 114a.

The valve actuating rod 55 is provided with threads 115 (Fig. 4) at its outer end and an internally threaded abutment 116 is mounted upon said threads. The abutment 116 is adapted to engage the member 88 to determine the position of the valve stem 85 to control the by-passing of fuel through the valve 63. The abutment 116 is adapted to be rotated relative to the rod 55 to effect proper initial adjustment of the stem 85 relative to the seat 97, and to be locked in adjusted position by a jamb nut 117 carried by the threaded portion 115 of the rod 55.

In the normal operation of the apparatus 1, the fluid in the heating coil 2 may range in temperature from about 100° F. when the apparatus is utilized to heat water, to a relatively high temperature of several hundred degrees when the apparatus is utilized to generate steam under high pressure. The liquid or fluid at the foregoing temperatures is in direct contact with the inner surface of the heating coil 2 including the tube ring R. On the other hand, the exterior of the tube ring R is subject to the temperature produced by the fuel being burned in the combustion chamber 8 and may vary from about 1200° F. to 3000° F.

By way of contrast, the fuel valve supporting ring 49 is exposed only to ambient temperatures, or at most to heat that has passed through the insulating material 12 into the air circulating space 14, so that the temperature of the ring 49 will vary from normal room temperature of about 70° F. up to about 200° F. Assuming that the heating coil 2 and the supporting ring 49 are made of similar materials, such as low carbon steel, the ring portion R of the heating coil, being subjected to relatively much higher temperatures than the supporting ring 49, will expand at a much greater rate.

It will be understood that since the tube ring R and the fuel valve control ring 49 are secured together in fixed relation by the spacer 46 and the cap screw 51, the tube ring R, upon expansion, will cause the valve control rod 55 to move in a direction away from the spacer 46. On the other hand, the expansion of the relatively cool supporting ring 49 is substantially negligible, so that the fuel valve 63 remains substantially stationary, but its stem 85 is moved toward the right, in opposition to the force of the spring 92, through the engagement of the abutment 116 with the member 88. Such movement of the valve stem 85 will permit an increased flow of fuel from the inlet chamber 95 to the outlet chamber 96, so that fuel, instead of being forced by the pump 104 into the conduit 35, is permitted to by-pass the nozzle 33 through the conduit 107, the fuel control valve 63 and conduit 112 and be returned to the fuel tank 100. Thus, as the temperature differential between the tube ring R and the supporting ring increases, the stem 85 of the fuel valve 63 will be actuated to effect further opening of said valve, or increase by-passing of the fuel back to the tank 110, so that the supply of fuel to the burner nozzle 33 is automatically reduced. The conventional spring-loaded valve 35a shuts off the fuel to the burner 33 entirely when the valve 63 is by-passing the maximum fuel back to the tank 100 during an excessive temperature period. On the other hand, should the temperature differential drop, the contraction of the tube ring R will retract the rod 55, thereby permitting the spring 92 to move the valve stem 85 toward the left, as viewed in Fig. 4, to reduce the by-passing of fuel through the valve 63 and in this way cause an increased volume of fuel to be delivered by the pump 104 to the conduit 35. When the pressure in the conduit 35 exceeds the spring load on the valve 35a, it will open and allow fuel flow to the burner nozzle 33 through the conduit 35.

The aforedescribed action of the tube ring R and the supporting ring 49 is diagrammatically illustrated in Fig. 5, wherein the cool condition of the tube ring R is illustrated in solid lines and the heated or expanded condition of said tube ring is indicated in dot-and-dash lines. The relative expansion of the tube ring R relative to the supporting ring 49 has been greatly exaggerated, to demonstrate the principle involved, but assuming that this is so, it will be apparent that the plate 53 carrying the valve actuating rod 55 is moved a substantial distance from the fuel line position to that shown in the dot-and-dash line position, thereby causing the rod 55 to move through a corresponding distance.

The extent of movement of the valve actuating rod 55 can be modified or controlled in various ways to obtain any action of the fuel by-pass valve 63 desired. Thus, as illustrated in Figs. 1 and 3, two additional spacers 46a may be mounted upon the tube ring R on a diametrical line B—B disposed 90 degrees to the line A—A upon which the spacer 46 and the valve actuating rod 55 are mounted. The inner ends of the spacers 46a are mounted upon plates 44a welded to the tube ring R in the same manner as the plate 44 previously described. The outer end of the spacers 46a has a shoulder 46b which engages the inner face of the supporting ring 49 and a cylindrical portion 46c extending beyond the shoulder 46b into an elongated slod 46d formed in the ring 49. The spacers 46a are dimensioned to extend between the tube ring R and the supporting ring 49 without normally causing distortion of either ring. Cap screws 51a having a washer under their head are mounted on the outer ends of the spacers 46a. These washers do not engage the supporting ring 49, thus leaving the ring 49 relatively free to move with respect to the spacers 46a and the tube ring R.

It will be apparent from Fig. 3 that upon expansion of the tube ring R, said ring will tend to move the operating rod 55 toward the right along diametrical line A—A, in the manner previously described in connection with Fig. 5. It will also be apparent that the spacers 46a acting along the diametrical line B—B, will tend to distort or elongate the supporting ring 49 along such diameter, with the net result that the portion of the tube ring 49 carrying the fuel valve 63 will tend to move toward the left, or in a direction opposite to that of the movement of the operating rod 55. Thus, the expansion of the tube ring R can be caused to effect a compound movement wherein the rod 55 moves in one direction to open the valve 63 to by-pass fuel, while the supporting ring 49 moves the valve 63 in a direction to accomplish a similar result. In this way, a greater extent of over-all opening of the valve 63 can be effected for a given temperature differential than when the valve 63 is maintained relatively stationary and only the rod 55 is moved.

Fig. 6 diagrammatically illustrates a further modified arrangement of the tube ring R and the supporting ring 49, to effect an even greater relative movement between the valve actuating rod 55 and the valve 63 than is effected by the use of the additional spacers 46a. It will be recalled that the spacers 46a engage the supporting ring 49 when the parts are in a cool condition, without producing any distortion or out-of-round condition in the ring 49. In Fig. 6, spacers 46A are disposed upon the diameter B—B, but are slightly greater in length, say about 1/16", than the space between the rings so that the supporting ring 49 is initially distorted from a true circular condition to a somewhat oval condition (the ring 49 being less rigid than tube ring R) with its major axis coinciding with the diameter B—B. This presents an initial condition comparable to that in which the supporting ring 49 is distorted by expansion of the tube ring R. Hence, it will be apparent that with the supporting ring 49 in a pre-distorted condition when cool, thermal expansion of the tube ring R will increase the distortion of the fuel valve supporting ring 49 with the result that the portion of said ring carrying the valve 63 will be moved toward the left at a greater rate per unit of thermal expansion of the tube ring R than when the ring 49 has not been initially distorted. In other words, a greater extent of relative movement between the actuating rod 55 and the valve 63 can be obtained with the arrangement shown in Fig. 6 than with that shown in Figs. 3 or 5. It will also be understood that the spacers 46A can be varied in length to produce any desired relative movement between the rod 55 and the valve 63. Aside from the modified action that can be obtained in the control of the fuel valve 63 through the use of the spacers 46a and 46A, the extent of opening of the valve can be varied by adjusting the abutment 116, as previously described, and in order to facilitate such adjustment, the cylindrical housing portion 64 is cut away to provide an access opening 118, to permit adjustment of the abutment 116 and the lock nut 117 to vary the position of the abutment 116 along the threaded portion 115 of the rod 55.

Fig. 7 illustrates an embodiment of the invention in which the differential expansion of the tube ring R and the supporting ring 49 is utilized to actuate a normally closed conventional switch 120, which is connected in circuit with a conventional solenoid-operated fuel valve 121, as will be explained more fully hereinafter. Thus, the valve 63 has been replaced by a relatively simple hollow bracket 122 secured to the annulus 75 by cap screws 123. The bracket 122 has a bore to slidably receive a spring biased rod 124. An arm 125 extends from the bracket 122 and the switch 120 is adjustably mounted upon said arm by screws 126. The switch 120 includes a pin 127 in axial alignment with the rod 124 and adapted to be engaged by said rod and actuated to open said switch.

One contact of the switch 120 is connected to a lead 128 and its other contact is connected by a conductor 129 with one terminal of the solenoid valve 121; the other terminal of said valve being connected to a conductor 130. The lead 128 and conductor 130 are connected with contacts of a main switch 131 to which electrical current is supplied through main lines 132 and 133.

The solenoid valve 121 is connected in a fuel supply line 134 leading to a burner 135, which may be of a type suitable to burn either gas or liquid fuel. The solenoid valve 121 is spring-biased to closed position to shut off the flow of fuel to the burner and must be energized to open. Accordingly, the main switch 131 must first be closed to complete the circuit to the solenoid valve 121 through the normally closed switch 120 to energize and effect opening of said valve. Should the differential expansion between the rings R and 49 become such that the rod 124 is moved to engage the pin 127 and open the switch 120, the circuit to the solenoid valve 121 will be interrupted and the valve deenergized to close and shut off fuel flow to the burner 135. Upon due change in temperature conditions, the rod 124 will be retracted from the pin 127 and the switch 120 will automatically close to reenergize and open the solenoid valve 121 to permit fuel to again flow to the burner 135. Thus, the flow of fuel will be automatically controlled in accordance with the differential expansion of the rings R and 49. The solenoid valve 121 can be closed at any time independently of the automatic control by manually opening the switch 131.

The switch control of Fig. 7 has the advantage over the by-pass fuel valve control for the reason that it can be used on either oil or gas-fired equipment, and also as a common control on combination oil-gas fired equipment.

While various ways of utilizing the differential expansion of the tube ring R and the fuel valve supporting ring 49 have been described and illustrated herein, it is to be understood that various additional adaptations of the principles involved will readily occur to those skilled in the art, and that the specific details of construction of the parts disclosed herein may be varied without departing from the principles of the invention or the scope of the annexed claims.

I claim:

1. Fluid heating apparatus, comprising: a heating coil including a plurality of adjacent helical convolutions; means securing at least two of said convolutions together to form, in effect, a continuous heating tube ring; a fuel control valve; a supporting ring connected with said heating tube ring and supporting said fuel control valve relative to said heating tube ring, said heating tube ring being subject to combustion gas temperatures and said supporting ring being arranged to be subject to substantially ambient temperatures; and means responsive to the differential expansion between said supporting ring and said heating tube ring for actuating said fuel control valve.

2. Apparatus as defined in claim 1, including means thermally insulating the supporting ring from the heating tube ring.

3. Apparatus as defined in claim 2, in which the heating tube ring and the supporting ring are made from metals having substantially the same coefficient of expansion.

4. Fluid heating apparatus, comprising: a heating coil including a plurality of adjacent helical convolutions; means securing at least two of said convolutions together at at least one point exteriorly thereof to form, in effect, a continuous heating tube ring; a fuel control valve; means supporting said fuel control valve in relatively fixed relation relative to said heating tube ring, said heating tube ring being subject to combustion gas temperatures and said supporting means being arranged to be subject to substantially ambient temperatures; and means operable in response to the differential expansion between said supporting means and said heating tube ring for actuating said fuel control valve.

5. Fluid heating apparatus, comprising: a heating coil including a plurality of adjacent helical convolutions; means securing at least two of said convolutions together at at least one point exteriorly thereof to form, in effect, a continuous tubular ring; a burner for heating said heating coil; a fuel pump connected with said burner for delivering fuel thereto; a fuel storage tank connected with said pump; a fuel control valve connected between said pump and fuel storage tank and arranged so that when it is opened it will by-pass fuel from said pump back to said storage tank and thereby prevent delivery thereof to said burner, said valve including a movable element for controlling the flow therethrough; means supporting said fuel control valve in fixed relation relative to said heating coil; and means operable in response to the differential expansion between said last-mentioned means and said tubular ring for actuating said flow control element of said fuel valve to effect by-passing of fuel upon predetermined expansion of said tubular ring.

6. Fluid heating apparatus, comprising: a jacket containing a combustion chamber; a heating coil including a plurality of adjacent helical convolutions disposed in said combustion chamber; means securing at least two of said convolutions together to form, in effect, a continuous tubular ring subject to the heat of the gases in said combustion chamber; a second ring in said jacket; means insulating said second ring from the heat of the gases in said combustion chamber; means securing said tubular ring and said second ring together at at least one point around the circumference thereof; a fuel control valve mounted upon said second ring in a region substantially diametrically opposite to said securing means, said fuel control valve including an element movable to control the flow of fuel therethrough; and means establishing an operative connection between said tubular ring and said element for actuating said element in accordance with the differential expansion of said rings.

7. Fluid heating apparatus, comprising: a heating coil including a plurality of adjacent helical convolutions; means securing two of said convolutions together at at least one point to form, in effect, a continuous tubular ring; heat insulating means concentric with and surrounding said heating coil; a second ring disposed exteriorly of said heat insulating means; a spacer member extending through said heat insulating means and having one end thereof connected with said tubular ring and its opposite end connected with said second ring; a fuel valve mounted upon said second ring in a region substantially diametrically opposite said spacer member, said fuel valve including an element movable to control the flow of fuel therethrough; and a rod having one end thereof connected with said tubular ring and also being diametrically opposed with respect to said spacer member, said rod having its opposite end disposed to actuate said flow control element of said fuel valve to move the same in accordance with the differential expansion of said rings.

8. Fluid heating apparatus as defined in claim 7, including a pair of spacer elements disposed upon a diametrical line substantially perpendicular to a diametrical line passing through said spacer member and rod, each of said spacer elements extending through the heat insulating means and having one end thereof connected with the tubular ring, and a shoulder adjacent the opposite end thereof engaged with the interior surface of the second ring, said spacer elements including extensions projecting from said shoulders, and said supporting ring having elongated slots to receive said extensions, whereby said spacer elements can move relative to said second ring upon relative expansion of said rings.

9. In a fluid heating apparatus, a member including a circumferentially continuous tubular ring through which the fluid to be heated is passed; a second ring surrounding said tubular ring; heat insulating means disposed between said rings; spacer means securing said two rings together in generally concentric spaced relation; a burner; a fuel valve connected with said burner, said tubular ring being subject to the heat of the products of combustion from said burner; and means responsive to differential expansion of said rings for controlling said fuel valve.

10. Apparatus as defined in claim 9, in which the spacer means is located diametrically of the rings.

11. In a liquid heating apparatus, a member including a circumferentially continuous tubular ring through which the fluid to be heated is passed; a second ring surrounding said tubular ring; means including a spacer member securing said two rings together in spaced relation at one point around the circumference thereof; heat insulating means disposed between said rings; a burner; a fuel valve connected with said burner, said tubular ring being subject to the heat of the products of combustion from said burner; and means responsive to differential expansion of said rings for actuating said fuel valve.

12. Apparatus as defined in claim 11, in which the fuel valve and its actuating means are located substantially diametrically opposite the spacer member.

13. Apparatus as defined in claim 12, including additional spacing means between the rings located upon a diameter substantially at right angles to that upon which the spacer member and fuel valve are disposed.

14. Apparatus as defined in claim 13, including means providing a circumferentially sliding connection between the additional spacing means and the second ring.

15. Apparatus as defined in claim 13, in which the rings are initially circular and in which the additional spacing means is of a length greater than the normal spacing between the rings, whereby at least one of the rings is distorted into an out-of-round condition.

16. In a liquid heating apparatus, a tubular member through which the fluid to be heated is passed, said member including a circumferentially continuous tube ring; a second ring surrounding said tube ring; heat insulating means disposed between said rings; a burner; a fuel valve connected with said burner, said tube ring being subject to the heat of the products of combustion from said burner; means securing said two rings together in fixed relation at one point around the circumference thereof; and means disposed substantially diametrically opposite said point arranged to actuate said fuel valve upon relative expansion of said rings.

17. In a fluid heating apparatus; a burner; a fuel control valve connected with said burner; a tubular member through which the fluid to be heated is passed, said member including a circumferentially continuous tube ring; a second ring surrounding said tube ring; means mounting said fuel valve upon said second ring; heat insulating means disposed between said rings; means securing said two rings together in fixed relation at a point substantially diametrically opposite said fuel valve, said tube ring being subject to the heat of the products of combustion from said burner; and means responsive to differential expansion of said rings for actuating said fuel valve.

18. In a liquid heating apparatus, a burner; a fuel control valve connected with said burner; a tubular member through which the fluid to be heated is passed, said member including a circumferentially continuous tube ring; a second ring surrounding said tube ring; heat insulating means disposed between said rings; means mounting said fuel valve upon said second ring, said fuel valve including an element for controlling flow therethrough; means securing said two rings together in fixed relation at a point circumferentially spaced from said fuel valve, said tube ring being subject to the heat of the products of combustion from said burner; and means connected with said tube ring arranged to actuate said flow control element of said fuel valve upon relative expansion of said rings.

19. In a liquid heating apparatus, a burner; a fuel control valve connected with said burner; a helical heating coil having two adjacent turns secured together to form a circumferentially continuous tube ring; a second ring surrounding said tube ring; heat insulating means disposed between said rings; means mounting said fuel valve upon said second ring, said fuel valve including an element for controlling flow therethrough; means securing said two rings together in fixed relation at one point about the circumference thereof, said tube ring being subject to the heat of the products of combustion from said burner; and means operable upon relative expansion of said rings for actuating said control element of said fuel valve.

20. In a fluid heating apparatus, a member including a circumferentially continuous tubular ring through which the fluid to be heated is passed; a second ring surrounding said tubular ring; heat insulating means disposed between said rings; means securing said two rings together in generally concentric relation; a burner; a solenoid-operated fuel valve connected with said burner; a switch connected in circuit with said solenoid-operated fuel, said tubular ring being subject to the heat of the products of combustion from said burner valve; and means responsive to differential expansion of said rings controlling the operation of said switch.

References Cited in the file of this patent

UNITED STATES PATENTS

| 1,399,938 | Doble | Dec. 13, 1921 |
| 1,968,525 | Kerrick | July 31, 1934 |
| 2,210,404 | Hahn | Aug. 6, 1940 |
| 2,242,885 | Heinzel | May 20, 1941 |